(12) United States Patent
Kong (10) Patent No.: US 11,059,158 B2
(45) Date of Patent: Jul. 13, 2021

(54) COMBINATION ELECTRIC TOOL AND CONTROL METHOD THEREFOR

(71) Applicant: Suzhou Cleva Electric Appliance Co., Ltd., Suzhou (CN)

(72) Inventor: Zhao Kong, Suzhou (CN)

(73) Assignee: Suzhou Cleva Electric Appliance Co., Ltd., Suzhou (CN)

( * ) Notice: Subject to any disclaimer, the term of this patent is extended or adjusted under 35 U.S.C. 154(b) by 331 days.

(21) Appl. No.: 15/305,396

(22) PCT Filed: Mar. 11, 2015

(86) PCT No.: PCT/CN2015/074014
§ 371 (c)(1),
(2) Date: Oct. 20, 2016

(87) PCT Pub. No.: WO2015/161722
PCT Pub. Date: Oct. 29, 2015

(65) Prior Publication Data
US 2017/0043470 A1 Feb. 16, 2017

(30) Foreign Application Priority Data
Apr. 24, 2014 (CN) .......................... 201410166931.9

(51) Int. Cl.
*B25F 3/00* (2006.01)
*H02K 11/33* (2016.01)
(Continued)

(52) U.S. Cl.
CPC ............. *B25F 3/00* (2013.01); *H02H 7/0844* (2013.01); *H02H 7/0854* (2013.01);
(Continued)

(58) Field of Classification Search
CPC .. B25F 3/00; B25F 5/021; B25F 5/024; B25F 1/02; H02K 11/33; H02K 7/14; H02H 7/0844; H02H 7/0854; H02H 7/0856
(Continued)

(56) References Cited

U.S. PATENT DOCUMENTS 3,965,510 A * 6/1976 Ernst ..................... B25B 21/007
7/158
4,127,923 A * 12/1978 Schnizler, Jr. ........ B23B 45/003
24/270
(Continued)

FOREIGN PATENT DOCUMENTS

| CN | 1934762 A | 3/2007 |
|---|---|---|
| CN | 201565940 U | 9/2010 |

(Continued)

OTHER PUBLICATIONS

International Search Report, for Application No. PCT/CN2015/074014, dated Jun. 4, 2015.

*Primary Examiner* — Robert F Long
*Assistant Examiner* — Eduardo R Ferrero
(74) *Attorney, Agent, or Firm* — JK Intellectual Property Law, PA (57) ABSTRACT

A combination electric tool includes a main body and at least one working part drivable via and separably attachable to the main body. The main body includes an electric motor and a control circuit with a signal recognition module having a microcontroller. The working part includes an identification module, the signal recognition module and the identification module being communicable such that the microcontroller can recognize the working part. A control method includes attaching the main body to the working part; judging which kind of working part is attached and selecting corresponding preset programs; sampling a working parameter value of the electric motor; comparing the sampled working parameter
(Continued)

value of the electric motor with a corresponding preset value, and judging whether the electric motor is at an abnormal working state; and if yes, powering off the electric motor, and if no, returning to the previous step.

12 Claims, 6 Drawing Sheets

(51) Int. Cl.
 *H02H 7/08* (2006.01)
 *H02H 7/085* (2006.01)
 *H02K 7/14* (2006.01)

(52) U.S. Cl.
 CPC ............ *H02H 7/0856* (2013.01); *H02K 7/14* (2013.01); *H02K 11/33* (2016.01)

(58) Field of Classification Search
 USPC ........................................................ 173/29
 See application file for complete search history.

(56) References Cited

U.S. PATENT DOCUMENTS

| | | | | |
|---|---|---|---|---|
| 4,413,538 A * | 11/1983 | Norman | ............... | B25F 3/00 81/57.13 |
| 4,413,937 A * | 11/1983 | Gutsche | ............... | B23B 51/108 279/144 |
| 4,514,172 A * | 4/1985 | Behringer | ............ | A61C 1/0007 433/126 |
| 4,553,187 A * | 11/1985 | Burns | ................. | H02H 3/0935 361/31 |
| 4,619,162 A * | 10/1986 | Van Laere | .............. | B25B 21/02 173/104 |
| 4,777,393 A * | 10/1988 | Peot | .......................... | B25F 3/00 310/50 |
| 5,052,496 A * | 10/1991 | Albert | ...................... | B25F 3/00 173/164 |
| 5,345,384 A * | 9/1994 | Przybyla | ............. | G01R 31/006 701/29.1 |
| 5,347,765 A * | 9/1994 | Mixon, Jr. | ............... | B23Q 3/12 279/145 |
| 5,511,912 A * | 4/1996 | Ellerbrock | ............. | B23D 51/16 144/35.2 |
| 5,712,543 A * | 1/1998 | Sjostrom | ........... | A61B 17/1626 318/67 |
| 5,771,516 A * | 6/1998 | Huang | ..................... | B25B 21/00 254/122 |
| 6,095,658 A * | 8/2000 | Kalousis | ................. | B25B 21/00 362/119 |
| 6,170,579 B1 * | 1/2001 | Wadge | ..................... | B25F 3/00 173/170 |
| 6,176,322 B1 * | 1/2001 | Wadge | ..................... | B25F 3/00 173/170 |
| 6,191,966 B1 * | 2/2001 | Yu | ..................... | H02M 7/53875 363/131 |
| 6,286,611 B1 * | 9/2001 | Bone | .......................... | B25F 3/00 173/170 |
| 7,661,172 B2 * | 2/2010 | Hilscher | ................ | A61C 17/22 15/22.1 |
| 8,628,467 B2 * | 1/2014 | Whitman | ......... | A61B 17/07207 600/129 |
| 9,751,176 B2 * | 9/2017 | McRoberts | ............ | B23Q 5/045 |
| 2001/0052416 A1 * | 12/2001 | Wissmach | ................ | B25F 5/00 173/4 |
| 2002/0134811 A1 * | 9/2002 | Napier | ..................... | B24B 23/04 227/131 |
| 2003/0037423 A1 * | 2/2003 | Siegel | ..................... | B25B 23/14 29/407.01 |
| 2005/0100867 A1 * | 5/2005 | Hilscher | .............. | A61C 17/221 433/216 |
| 2005/0131390 A1 * | 6/2005 | Heinrich | .............. | A61B 17/062 606/1 |
| 2005/0200087 A1 * | 9/2005 | Vasudeva | .................. | B25F 3/00 279/143 |
| 2005/0248320 A1 * | 11/2005 | Denning | ................... | B25F 5/00 320/141 |
| 2008/0038073 A1 * | 2/2008 | Paolicelli | .................. | B25F 3/00 408/99 |
| 2008/0250570 A1 * | 10/2008 | Dayton | ..................... | B25F 3/00 7/170 |
| 2008/0255413 A1 * | 10/2008 | Zemlok | ................ | A61B 17/072 600/106 |
| 2010/0032179 A1 * | 2/2010 | Hanspers | .................. | B25F 5/00 173/11 |
| 2011/0174099 A1 * | 7/2011 | Ross | ..................... | A61B 17/072 74/89.32 |
| 2011/0198103 A1 * | 8/2011 | Suzuki | ................ | H02J 7/00309 173/46 |
| 2011/0272172 A1 * | 11/2011 | Lau | ........................... | B25F 3/00 173/170 |
| 2012/0050922 A1 * | 3/2012 | Yamai | ..................... | G01R 31/02 361/31 |
| 2012/0118595 A1 * | 5/2012 | Pellenc | ..................... | B25F 3/00 173/46 |
| 2012/0162840 A1 * | 6/2012 | Noda | ..................... | H02J 7/0029 361/78 |
| 2012/0318545 A1 * | 12/2012 | Schreiber | .................. | B25F 3/00 173/1 |
| 2012/0326637 A1 * | 12/2012 | Dai | ............................ | B25F 3/00 318/4 |
| 2013/0033233 A1 * | 2/2013 | Noda | .................... | H01M 10/44 320/134 |
| 2013/0118767 A1 * | 5/2013 | Cannaliato | .............. | B25F 5/021 173/29 |
| 2013/0255980 A1 * | 10/2013 | Linehan | .................... | B25F 5/00 173/2 |
| 2014/0117892 A1 * | 5/2014 | Coates | .................... | A01D 69/02 318/139 |
| 2014/0260505 A1 * | 9/2014 | Bowles | ..................... | B25F 3/00 72/453.16 |
| 2014/0260720 A1 * | 9/2014 | Hartranft | ................ | F16H 21/22 74/42 |
| 2015/0041166 A1 * | 2/2015 | Van Der Linde | ......... | B25F 3/00 173/29 |
| 2016/0021819 A1 * | 1/2016 | Nakano | .................. | A01G 3/062 30/276 |
| 2017/0202608 A1 * | 7/2017 | Shelton, IV | ....... | A61B 18/1445 |

FOREIGN PATENT DOCUMENTS

| | | |
|---|---|---|
| CN | 103963023 A | 8/2014 |
| CN | 203831361 U | 9/2014 |
| CN | 203831362 U | 9/2014 |

\* cited by examiner

COMBINATION ELECTRIC TOOL AND CONTROL METHOD THEREFOR

CROSS-REFERENCE TO RELATED APPLICATIONS

This application is a national stage of International Application No. PCT/CN2015/074014, filed Mar. 11, 2015, and claims benefit of Chinese Patent Application No. CN 201410166931.9, filed Apr. 24, 2014, both of which are incorporated by reference herein.

TECHNICAL FIELD

The invention relates to a combination electric tool and a control method therefor.

BACKGROUND

A combination electric tool is an electric tool with replaceable working parts (also sometimes called a tool combo kit, a modular tool kit, or a tool system), and generally comprises a main body and a plurality of working parts, wherein the main body and the working parts may be separated or attached. The main body may be provided with a battery pack, an electric motor and a handle. Each working part may be for example, a stick blade, a grass cutting head or a saw blade, etc. A user may select different working parts to be connected with the main body according to different working requirements, rather than requiring a traditional electric tool for each working requirement. Multiple combination electric tools are also disclosed in the prior art. U.S. Pat. No. 6,181,032 discloses a system in which working parts can be replaced, and a handle having a switch is connected with different working parts through a specific structure. However, because different working parts have different requirements for a working current and the electric motor, it may cause failure of the efficiency and safety of the working part when only the working part is replaced.

CN 200880104102.0 discloses an electric tool system including a communication system, wherein the communication system is able to exchange information such as type and state of a battery pack tool connected therewith. However, such system is more complicated, relatively high in manufacturing cost and not widely accepted in the market.

SUMMARY

The present invention provides a combination electric tool comprising at least one main body and at least one working part which may be separated or attached from the main body, wherein a separable and attachable transmission device is arranged therebetween. The main body includes an electric motor and a control circuit, the control circuit comprising a signal recognition module including a microcontroller, the working part including an identification module. The signal recognition module and the identification module are electrically connected or in wireless communication, such that the microcontroller can recognize the working part.

Some technical solutions of the present invention are as follows:

Preferably, the identification module comprises an identification resistor, and the resistance values of the identification resistors in the working parts are not identical.

Preferably, the identification module comprises a plurality of interfaces at least one of which is a common interface, and when the main body and the working part are attached, the common interface is electrically connected with the control circuit.

Preferably, the control circuit comprises a sampling resistor which may be electrically connected with the microcontroller and the common interface respectively.

Preferably, the identification module comprises a sensor which is configured to acquire working state parameters of the working part.

Preferably, the signal recognition module further comprises a wireless signal receiver, and the identification module comprises a wireless signal transmitter.

Preferably, the control circuit comprises a monitoring control module which is electrically connected with the electric motor and the microcontroller.

Preferably, the control circuit further comprises a voltage monitoring module, the voltage monitoring module being electrically connected with a battery pack provided on the main body and the microcontroller and configured to monitor a voltage of the battery pack.

Preferably, a first connecting part is provided on the main body, a second connecting part is provided on the working part, and the identification module is electrically connected with the control circuit when the first connecting part and the second connecting part are attached.

A control method is disclosed for the combination electric tool, the control method comprising the following steps: (1) attaching the main body to the working part; (2) judging which kind of working part is accessed and calling corresponding preset programs using the microcontroller, (3) sampling a working parameter value of the electric motor using the microcontroller, (4) comparing the sampled working parameter value of the electric motor with a corresponding preset value, and judging whether the electric motor is at an abnormal working state; and (5) if yes as judged in step (4), powering off the electric motor, and if no as judged, returning to the step (4).

Preferably, the working parameter value of the electric motor in step (4) is current, and a method for judging whether the electric motor is at an abnormal working state comprises: if the sampled current value of the electric motor is greater than the preset value, adding 1 to an overcurrent counter; if the current value of the electric motor is not greater than the preset value, adding 1 to a non-overcurrent counter; and if the non-overcurrent counter satisfies a preset number of times, resetting the non-overcurrent counter and the overcurrent counter at the same time, and judging whether the accumulative number of times of the overcurrent counter exceeds a preset overcurrent number of times.

Preferably, in step (2), the preset programs are a driving program and a protecting program for the electric motor.

The present invention has the following beneficial effects: the combination electric tool of the present invention can recognize different working parts, and is thus safe and efficient in use because different control methods are adopted against different working parts, and meanwhile, the hardware cost is reduced because the electric motor in the main body is in common use by different working parts.

DETAILED DESCRIPTION

The disclosed subject matter is further described below in combination with the drawings.

Figure 1:
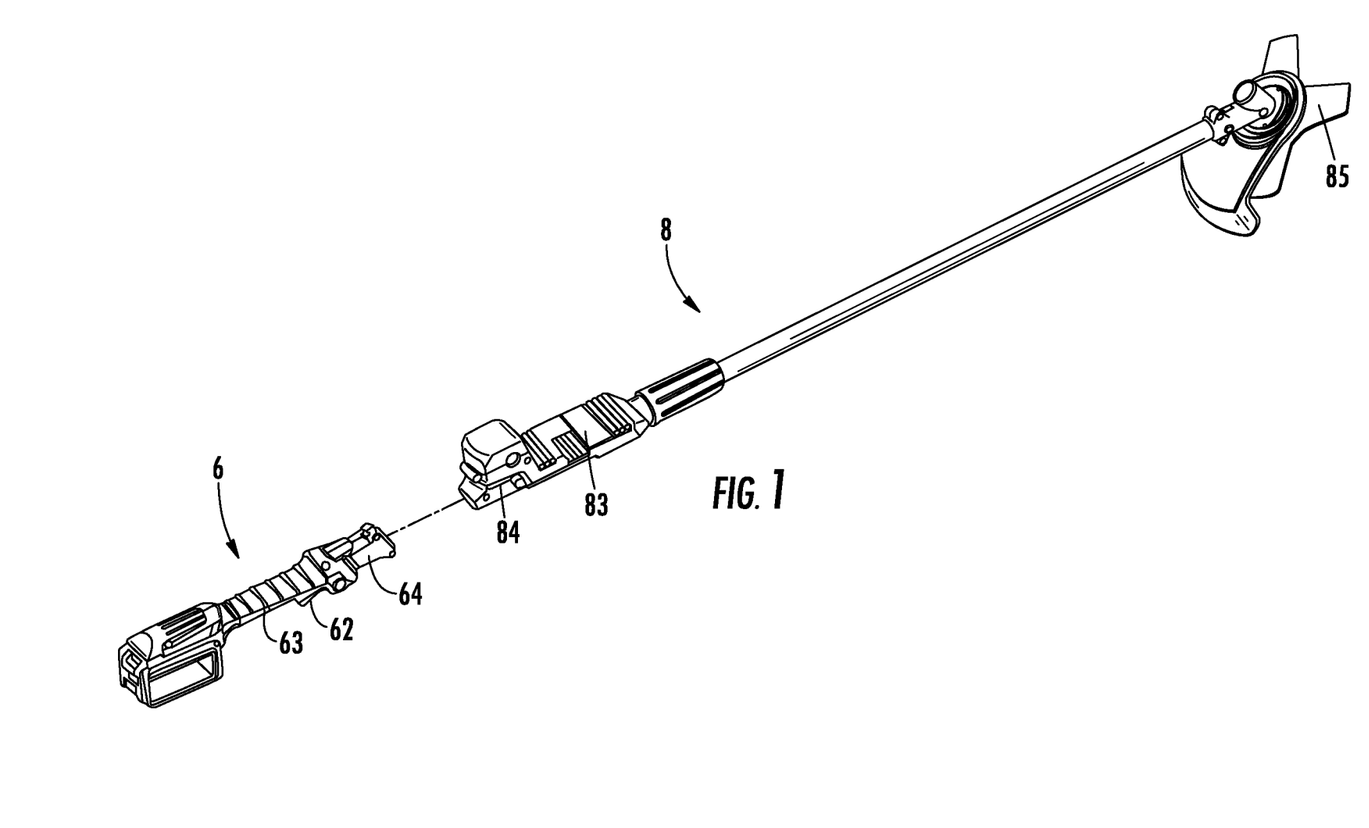
FIG. 1 is a schematic drawing of the combination electric tool according to certain embodiments of the present invention.
Figure 2:
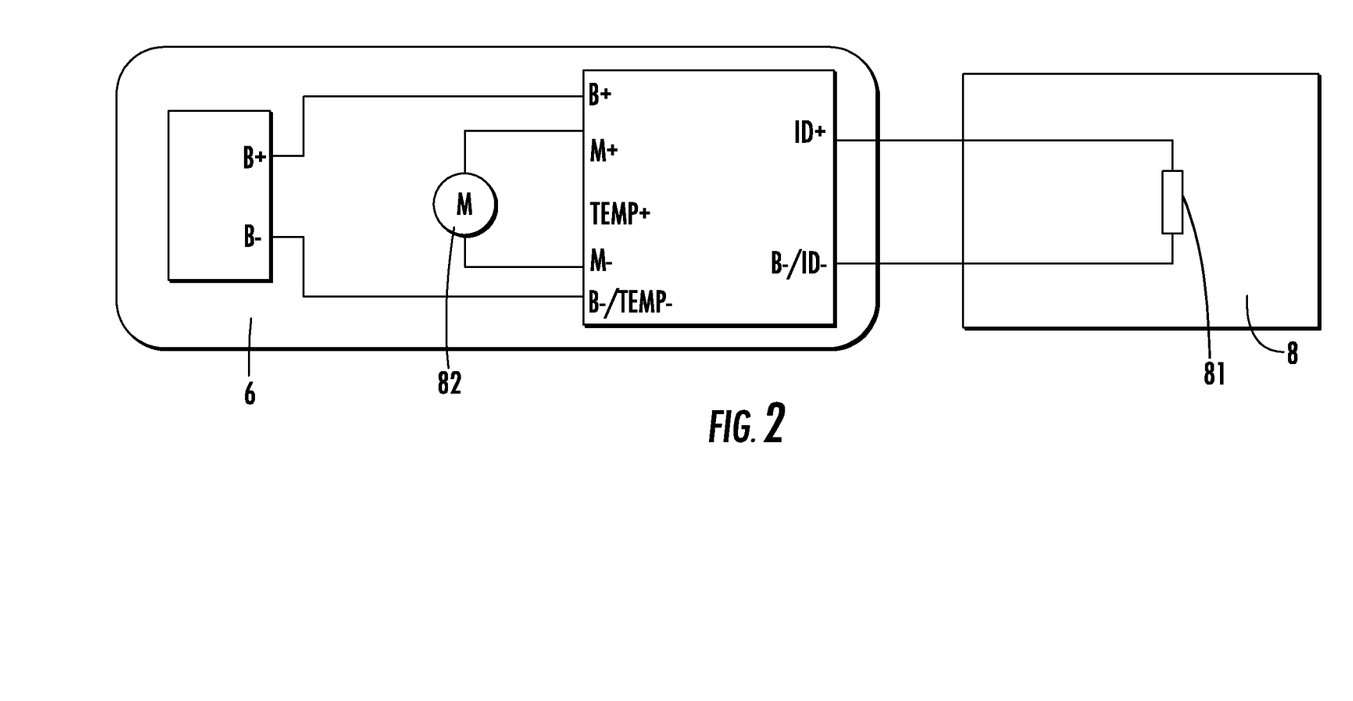
FIG. 2 is another schematic drawing of the combination electric tool according to embodiment 1 of the present invention.

As shown in FIG. 1 and FIG. 2, a combination electric tool in one embodiment comprises a main body 6 and a working part 8, wherein a first connecting part 64, a handle 63, a switch 62 and a battery pack 61 are provided on the main body 6. The battery pack 61 supplies working energy to the electric tool. An operator can hold the electric tool through the handle 63 and operate the switch 62 to start the electric tool. The main body 6 is provided therein with a control circuit 5 which is configured to control operation of the electric tool. The working part 8 comprises a shell 83, a second connecting part 84 and a working head 85, wherein the working head 85 is used for operations. For example, in a brush cutter as shown in FIG. 1, the working head 85 is a rotating blade; if the electric tool is a pair of pruning shears, the working head is a stick blade; and if the electric tool is a reciprocating saw, the working head is a saw blade. Therefore, different electric tools are equipped with different working heads 85 to adapt to different working requirements. The main body 6 includes an electric motor 82 and the working 8 part includes a recognition resistor 81 (as shown in FIG. 2). The first connecting part 64 and the second connecting part 84 include respective plug-in connectors, the plug-in connectors being electrically connected, such that the control circuit in the main body 6 can be electrically connected with the recognition resistor 81 in the working part 8 when the first connecting part 64 and the second connecting part 84 are attached. Each plug-in connector may be in a form of a conventional male plug and a conventional female plug or in a form of contact connection, although there are multiple other ways to implement such connectors. If the combination electric tool has a plurality of working parts 8, resistance values of recognition resistors 81 in the working parts 8 are set to be not identical, for example, the resistance value of the working part of the reciprocating saw may be set to 10 k ohm, and the resistance value of the working part of the pruning shears may be set to be 5 k ohm. When different working parts 8 are connected with the main body 6, the control circuit can recognize different working parts, thereby selecting different circuit control modes according to working requirements of the different working parts.

Figure 3:
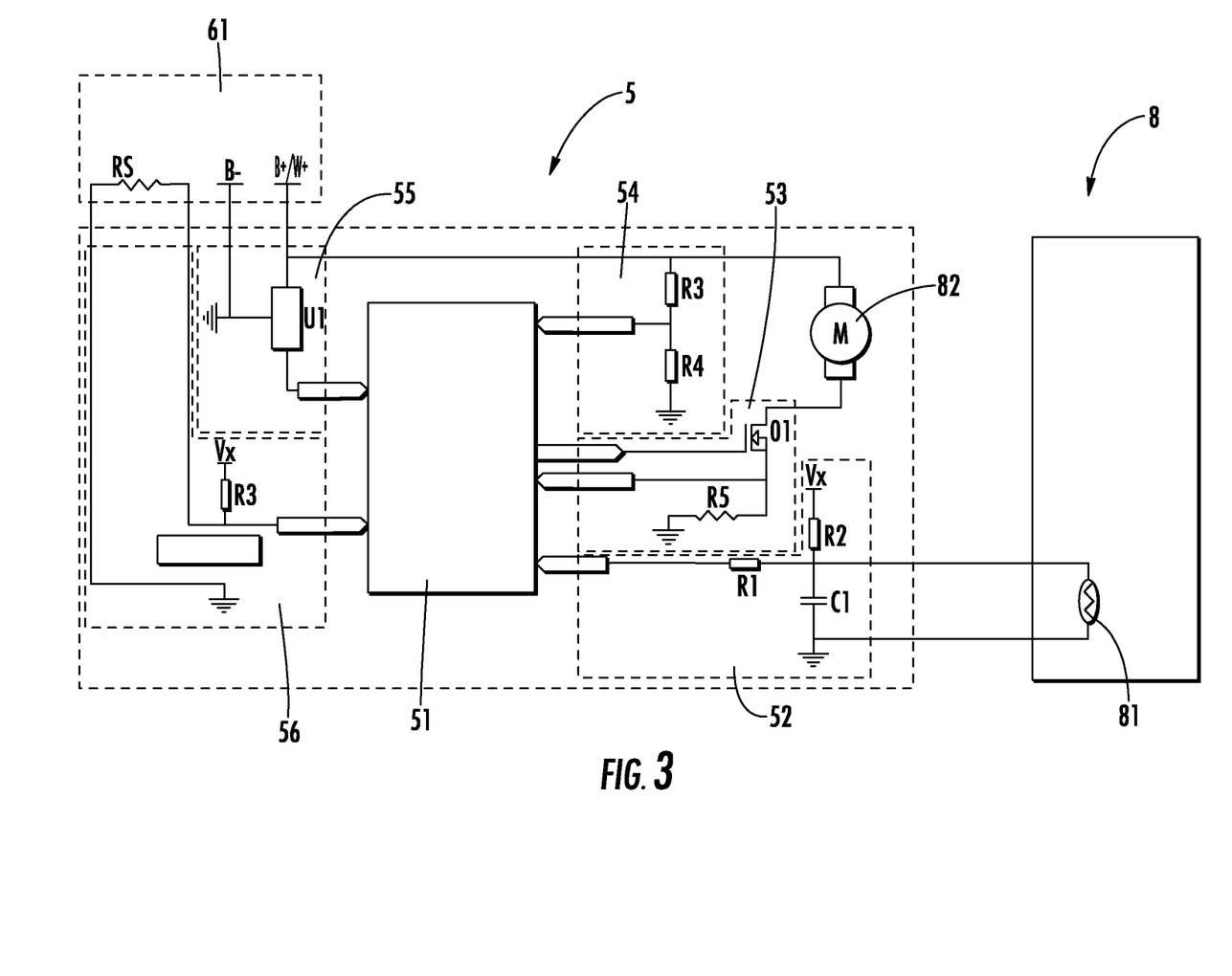
FIG. 3 is a schematic drawing of a control circuit of the combination electric tool according to embodiment 1 of the present invention.

As shown in FIG. 3, the control circuit 5 comprises a microcontroller 51, a recognition module 52, a monitoring control module 53, a voltage monitoring module 54, a power supply conversion module 55 and a temperature acquisition module 56. The microcontroller 51 may store programs for controlling operation of the whole control circuit 5. The recognition module 52 can be electrically connected with the recognition resistor 81. When the first connecting part 64 is connected with the second connecting part 84, the recognition module 52 is electrically connected with the recognition resistor 81 and outputs a voltage signal to the microcontroller 51, and the microcontroller can recognize the working part 8 according to the comparison of the voltage signal and a preset value preset in the microcontroller. The microcontroller 51 can call corresponding control programs according to the recognized working part 8 to change the working of other circuit module. For example, if the microcontroller 51 recognizes the working part 8 as the brush cutter, the microcontroller 51 controls the control circuit to output a working current suitable for the brush cutter and selects circuit protection parameters suitable for the brush cutter, thereby making the working part operate more efficiently and safely. The monitoring control module 53 is configured to detect a current flowing through the electric motor 82 and transmit a sampled current signal to the microcontroller to make a judgment, and if the current of the electric motor is higher than a preset value, the monitoring control module 53 cuts off the current of the electric motor to present the electric motor from being burnt, such that the electric tool can be used safely. The voltage monitoring module 54 is configured to detect a voltage of the battery pack 61 and output a voltage signal of the battery pack to the microcontroller 51, the microcontroller compares the voltage signal of the battery pack with a preset value and judges whether the voltage of the battery pack is lower than the preset value. If the voltage of the battery pack is lower than the preset value, the microcontroller controls the monitoring control module 53 to cut off the current of the electric motor 82. The power supply conversion module 55 is configured to supply power to the microcontroller 51. The temperature acquisition module 56 is configured to acquire a temperature of the battery pack 61, and when the temperature of the battery pack is higher than a preset value, the monitoring control module 53 cuts off the current of the electric motor 82. In this embodiment, the microcontroller 51 may judge different working parts according to the received different voltage signals.

The electric motor 82 is provided on the main body 6, and therefore the plurality of working parts 8 can share one electric motor. The electric motor 82 may be a brushless electric motor having a relatively wide range of speed, can be favorably controlled according to programs, has relatively high efficiency under different speeds and may adapt to performance demands of different working parts 8. Power provided by the electric motor 82 is transferred to the working head 85 (for example, a cutting blade of a lawn mower) on the working part 8. A clutch may be adopted as a transmission device. For example, a clutch is provided on the main body 6, a clutch drum is provided on the working part 8. When the working part 8 is attached to the main body 6, the electric motor 82 drives the clutch to rotate, and a centrifugal block of the clutch is combined with the clutch drum through a friction force, thereby driving the clutch drum to rotate, such that the working head 85 on the working part rotates. As is known to those skilled in the art, rotation can also be realized by replacement with other transmission devices. The electric motor 82 in the main body 6 supplies power to different working parts 8 to avoid the mounting of an electric motor in each of the different working parts, such that the manufacturing cost of the combination electric tool is reduced. A recognition mode between the main body 6 and the working part 8 may also be carried out as described in the following embodiments.

Figure 4:
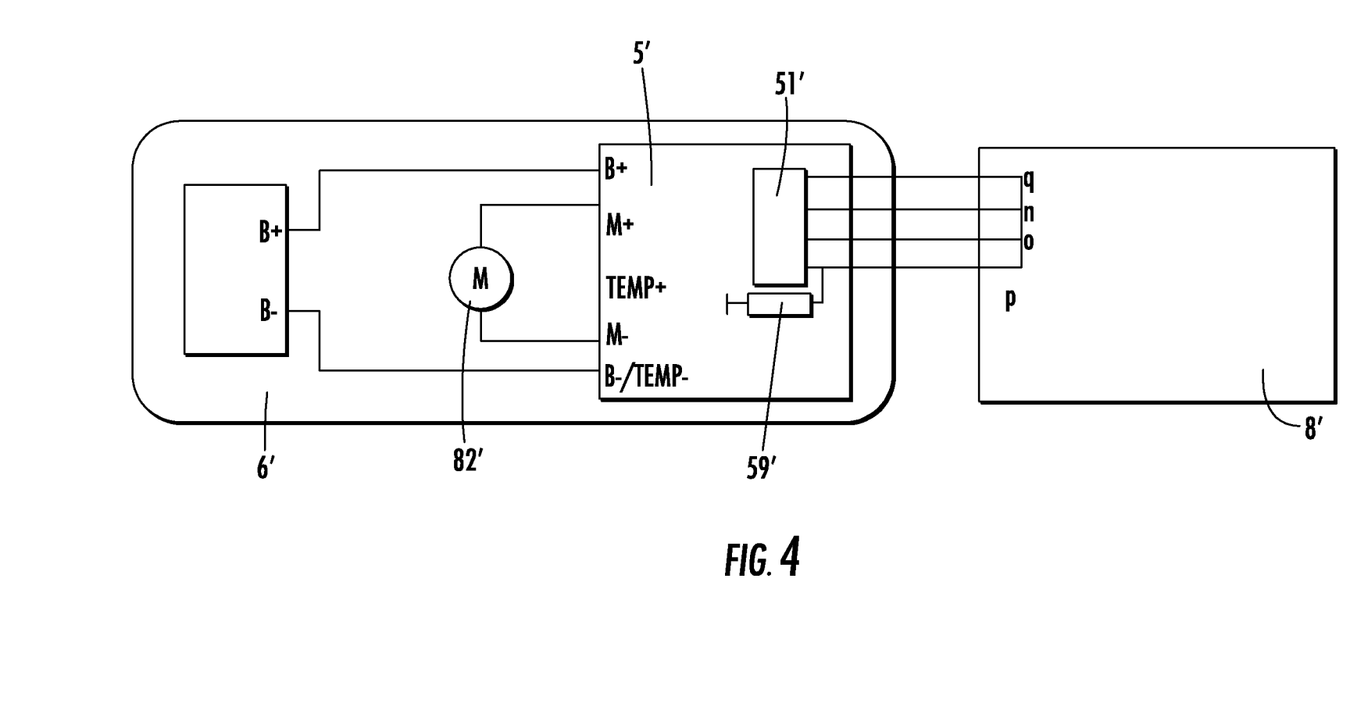
FIG. 4 is a schematic drawing of the combination electric tool according to embodiment 2 of the present invention.

The second implementation is as shown in FIG. 4. In this embodiment, a microcontroller 51' and a sampling resistor 59' are provided on a control circuit 5' on a main body 6', wherein one end of the sampling resistor is grounded, and the other end thereof is electrically connected with the microcontroller. A working part 8' is provided with four interfaces, namely q, n, o and p respectively. The interface p is common to all working parts 8', that is, after the main body 6' and the working part 8' are attached, the interface p is electrically connected with the sampling resistor 59' and the microcontroller 51', and the sampling resistor can enable the microcontroller 51' to detect a fed-back pulse signal. One of the interfaces q, n and o on different working parts 8' is electrically connected with the interface p. For example, in this embodiment, three different working parts 8' may be attached with the main body 6', the interface q on the first working part 8' is electrically connected with the interface p, and the interface m and the interface o are not electrically connected with the interface p. The interface n on the second working part 8' is electrically connected with the interface p, and the interface q and the interface o are not electrically connected with the interface p. The interface o on the third working part 8' is electrically connected with the interface p, and the other two interfaces are not electrically connected with the interface p. After the main body 6' and the first working part 8' are attached, the microcontroller 51' transmits a pulse signal (for example a voltage pulse signal) to the interfaces q, n and o successively. Because only the interface q is electrically connected with the interface p, only the pulse signal transmitted to the interface q can be fed back, and a single chip can determine that the interface q is electrically connected with the interface p according to the feedback signal and a preset judgment program, thereby determining that the working part 8' attached to the main body 6' is a first working part 8'. Different numbers of interfaces may be used according to different numbers of working parts 8'. For example, six interfaces may be used in which one is a common interface if there are five working parts.

Figure 5:
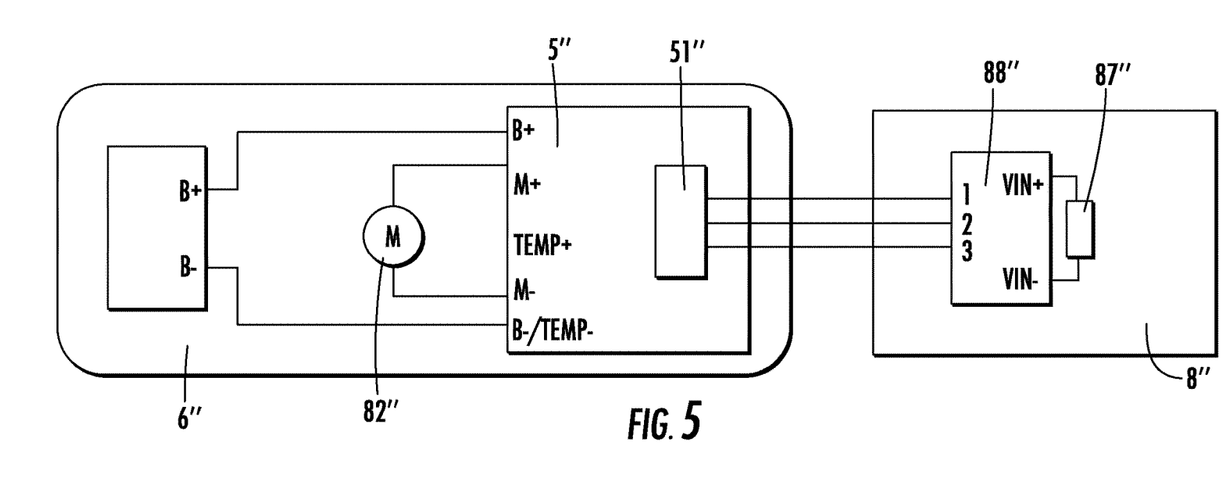
FIG. 5 is a schematic drawing of the combination electric tool according to embodiment 3 of the present invention.

The third implementation is as shown in FIG. 5, a control circuit 5" comprises a microcontroller 51". A sensor 88" and a power supply 87" are provided on a working part 8", wherein the power supply supplies power to the sensor 88". When a main body 6" and the working part 8" are attached, the microcontroller 51" is electrically connected with the sensor 88", and the motor 82" can be electrified and started. The sensor 88" can be configured to acquire working state parameters of the working part 81", such as speed, current and power, and then feedback these parameters to the microcontroller 51", and the microcontroller 51" can judge which kind of working head to operate according to received parameter signals, thereby further controlling the working head. The main body 6" of the electric tool in this embodiment not only can judge the working part 8", but also can acquire the working state parameters of the working part, thereby controlling the working part better.

Figure 6:
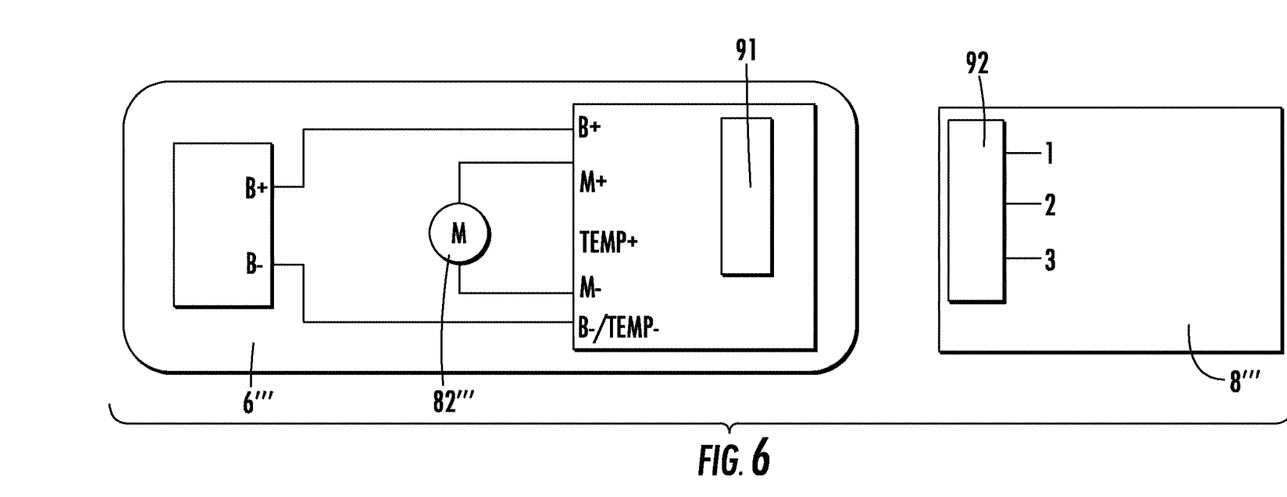
FIG. 6 is a schematic drawing of the combination electric tool according to embodiment 4 of the present invention.

The fourth implementation is as show in FIG. 6. In this embodiment, a main body 6''' and a working part 8''' are recognized via a manner of arranging a wireless communication device, that is, the main body can recognize the working part without directly connecting with the working part. A wireless signal receiver 91 is provided on the main body 6''', a wireless signal transmitter 92 is provided on the working part 8''', and when a user starts the signal transmitter on the working part, the signal receiver on the main body can recognize the working part via the received signal, thereby selecting a control program and a driving program corresponding to the working part. The wireless communication device may be at least one of a magnetic induction device (for example, a Hall sensor), a radio frequency transmitter-receiver, an infrared transmitter-receiver, an optical communication device, a proximity switch etc.

Figure 7:
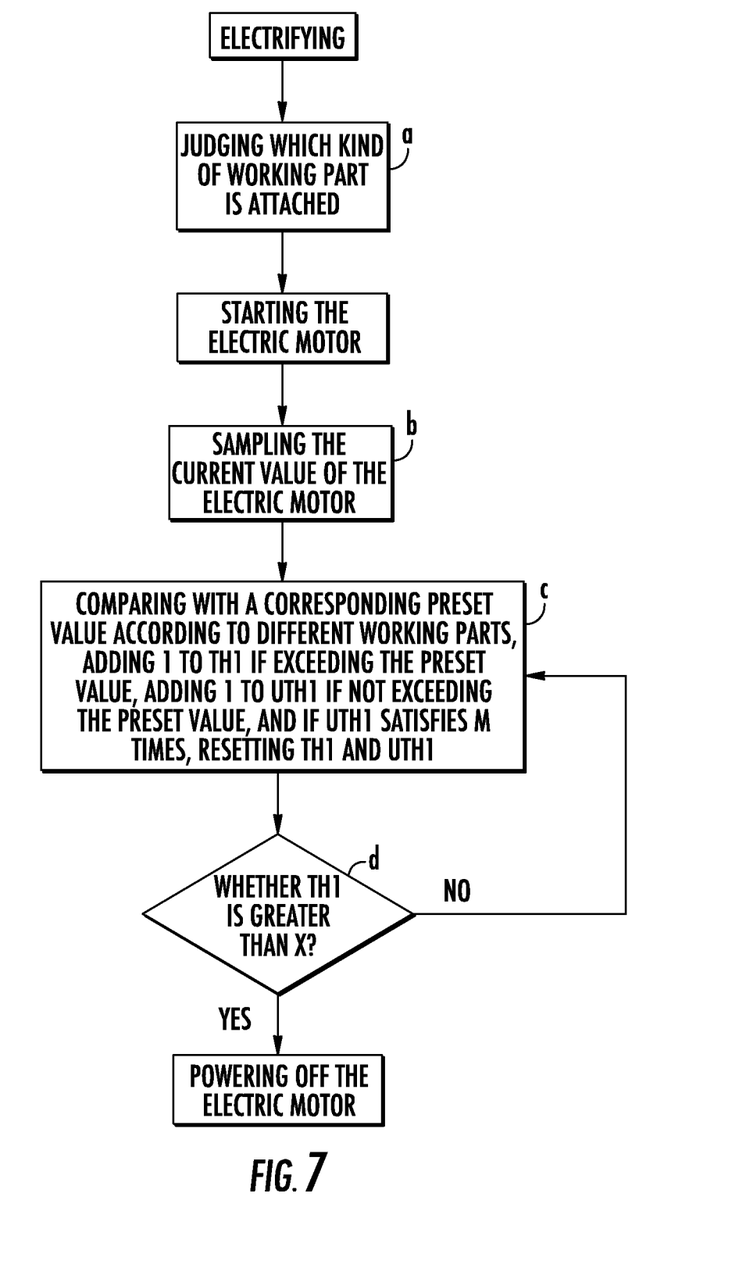
FIG. 7 is a flowchart of the control method for the combination electric tool according to embodiments of the present invention.

FIG. 7 illustrates a flowchart of a control method for a combination electric tool. After the main body 6 and the working part 8 are attached together, in step a, the kind of working part attached is judged by the microcontroller, and the specific judgment method being described hereinabove. In step b, after the electric motor 82 is started, a current value of the electric motor is sampled by a monitoring control module 53 (as shown in FIG. 3). In step c, the microcontroller 51 compares the current value of the electric motor 82 sampled in step b with a preset value of the corresponding working part. For example, if judging that the brush cutter is accessed in step a, the microcontroller 51 compares the sampled current value of the electric motor 82 with a preset value of the brush cutter in step c. The preset values may be different for different types of electric tools. TH1 and UTH1 in step c are an overcurrent counter and a non-overcurrent counter, respectively. If the current value of the electric motor 82 is greater than the preset value, 1 is added to the overcurrent counter; if the current value of the electric motor does not exceed the preset value, 1 is added to the non-overcurrent counter. If the non-overcurrent counter is incremented by 1 M times, TH1 and UTH1 are reset to 0. The value of M is pre-selected according to design requirements. The counters are employed for judging whether the electric motor 82 overcurrent is not sustainable in step d. If so, the electric motor is powered off to prevent potential safety hazards. Accordingly, in step d, if the value of TH1 is greater than X, the motor 82 is powered off, and if the value of TH1 is not greater than X, it returns to step c. The numerical value of X may be set according to design requirements. For example, a value of X which is 100 indicates that the electric motor is powered off after the overcurrent of the electric motor is exceeded 100 times. The counters are employed so as to prevent the electric motor 82 from being undesirably powered off and affecting the normal work of the electric tool, in which the current fluctuation of a typical electric motor exceeds a preset value occasionally. By means of the control method, when different working parts 8 are connected to the main body 6, the microcontroller 51 can select circuit parameters and current protection points suitable for the connected type of working part to ensure that the electric motor is at a normal state for the corresponding working part, such that the working part can operate more safely and efficiently. In addition to the judgment by sampling the current value of the electric motor 82, it is also possible to judge that the electric motor 82 is at a normal working state or an abnormal working state via other working parameter values of the electric motor, for example, a voltage or speed when the electric motor operates.

According to the disclosed combination electric tool of the present invention, the control circuit and the microcontroller are provided on the main body, such that the microcontroller can recognize different working parts via received identification signals of the working parts, such as a voltage signal, a pulse signal, a working state parameter signal and a wireless signal in differing embodiments. The electric tool is safe and efficient in operation because different control methods may be adopted for different working parts, and meanwhile the hardware cost is reduced. It should be noted that the above-mentioned preferred embodiments are just for illustrating the technical concept and features of the present invention for a purpose of enabling those know this technique well to understand the content of the present invention and implement the content, without limiting the protection scope of the present invention. All the equivalent variations or modifications made according to the spirit essence of the present invention should fall into the protection scope of the present invention.

I claim:

1. A combination electric tool comprising:
   at least one main body;
   at least one working part drivable by the main body and which may be separated from or attached to the main body;
   the main body including an electric motor and a control circuit, the control circuit including a signal recognition module having a microcontroller, the control circuit further including a sampling resistor; and
   the working part including an identification module including a plurality of interfaces, the plurality of interfaces including a common interface and a plurality of additional interfaces, only one of the additional interfaces being in electrical connection with the common interface, the signal recognition module and the identification module being in communication such that the microcontroller is configured to transmit a pulse signal sequentially to each of the additional interfaces and the microcontroller is configured to recognize an identity of the working part based on an identity of the one of the additional interfaces in electrical connection with the common interface providing a feedback signal to the microcontroller, and when the main body and the working part are attached the common interface is electrically connected to the microcontroller and the sampling resistor, the microcontroller storing programs for controlling the operation of the control circuit and selecting programs from the stored programs for controlling for the control circuit based on a recognized identity of the working part attached to the main body.

2. The combination electric tool according to claim 1, wherein the identification module in each of the working parts includes a sensor which is configured to acquire working state parameters of the working part.

3. The combination electric tool according to claim 1, wherein the control circuit includes a monitoring control module which is electrically connected to the electric motor and the microcontroller.

4. The combination electric tool according to claim 3, wherein the control circuit further includes a voltage monitoring module, the voltage monitoring module being electrically connected to a battery pack provided on the main body and to the microcontroller and configured to monitor a voltage of the battery pack.

5. The combination electric tool according to claim 3, wherein a first connecting part is provided on the main body, a second connecting part is provided on the working part, and the identification module is electrically connected to the control circuit when the first connecting part and the second connecting part are attached.

6. The combination electric tool according to claim 1, wherein the plurality of interfaces includes at least two additional interfaces as well as the common interface, the common interface being electrically connected with only one of the at least two additional interfaces.

7. The combination electric tool according to claim 6, wherein the at least one working part includes at least two of the working parts, the common interface of each of the two working parts being connected to a respective different one of the at least two additional interfaces.

8. A control method for a combination electric tool having a main body and at least one working part, the main body having an electric motor and a control circuit having a microcontroller and a sampling resistor, the working part having a plurality of interfaces, the plurality of interfaces including a common interface and a plurality of additional interfaces, only one of the additional interfaces being in electrical connection with the common interface, the control method comprising the following steps:
   (1) attaching the main body to the working part so that the common interface is electrically connected to the microcontroller and the sampling resistor;
   (2)(a) judging an identity of the working part attached to the main body and communicating the identity of the working part attached to the main body via communication between the main part and the working body, the judging being performed by the microcontroller transmitting a pulse signal sequentially to each of the additional interfaces and receiving a feedback signal from the one of the additional interfaces in electrical connection with the common interface; and
   2(b) selecting corresponding preset programs using the microcontroller based on a judged identity of the working part attached to the main body;
   (3) sampling a working parameter value of the electric motor using the microcontroller;
   (4) comparing the sampled working parameter value of the electric motor with a corresponding preset value, and judging whether the electric motor is at an abnormal working state; and
   (5) if yes as judged in step (4), powering off the electric motor, and if no as judged in step (4), returning to the step (4).

9. The control method according to claim 8, wherein the working parameter value of the electric motor compared in step (4) is a current value, and the step of judging whether the electric motor is at an abnormal working state comprises:
   if the sampled current value of the electric motor is greater than the preset value, adding 1 to an overcurrent counter;
   if the current value of the electric motor is not greater than the preset value, adding 1 to a non-overcurrent counter;
   if the count of the non-overcurrent counter reaches a preset non-overcurrent number, resetting the non-overcurrent counter and the overcurrent counter at the same time; and
   if the count of the overcurrent counter exceeds a preset overcurrent number, powering off the electric motor.

10. The control method according to claim 8, wherein, in step (2), the preset programs are a driving program and a protecting program for the electric motor.

11. The control method according to claim 8, wherein the plurality of interfaces includes at least two additional interfaces as well as the common interface, the common interface being electrically connected with only one of the at least two additional interfaces.

12. The control method according to claim 11, wherein the at least one working part includes at least two of the working parts, the common interface of each of the two working parts being connected to a respective different one of the at least two additional interfaces.

* * * * *